2 Sheets--Sheet 1.

A. GOODYEAR.
Excavator.

No. 161,221. Patented March 23, 1875.

Witnesses.
A. Ruppert.
P. J. Boland

A. Goodyear
Inventor:
D. P. Holloway & Co
Attys

THE GRAPHIC CO.PHOTO-LITH.39 & 41 PARK PLACE,N.Y.

2 Sheets--Sheet 2.

A. GOODYEAR.
Excavator.

No. 161,221. Patented March 23, 1875.

Witnesses.
A. Ruppert.
P. J. Boland

A. Goodyear
Inventor.
D. T. Holloway & Co
Attys

THE GRAPHIC CO. PHOTO-LITH. 39 & 41 PARK PLACE, N.Y.

UNITED STATES PATENT OFFICE.

ANDREW GOODYEAR, OF ALBION, MICHIGAN.

IMPROVEMENT IN EXCAVATORS.

Specification forming part of Letters Patent No. 161,221, dated March 23, 1875; application filed October 14, 1874.

*To all whom it may concern:*

Be it known that I, ANDREW GOODYEAR, of Albion, in the county of Calhoun and State of Michigan, have invented a new and useful Improvement in Self-Loading Manure-Wagons; and I do hereby declare that the following is a specification of the same.

My invention is intended for use in farming, for taking up and conveying manure from the stable-yard to the field where it is intended to be used; and my invention consists in combining, with the frame to which the draft is applied, a fork, for taking up the coarser portions of the manure, and a scraper, for scraping up such portions as are not caught by the forks, both capable of being raised after they are loaded, so as to carry away the manure; also, in mechanism for raising and lowering the forks and scraper, in such manner that the points of the fork and front edge of the scraper shall travel most rapidly, both in ascending and descending; also, in the mechanism adopted for supporting the front end of the teeth and scraper, and for dropping the same at the will of the operator; also, in the means adopted for obstructing the lifting of the forks and scraper until, the load having been taken on, they are raised by the operator.

Figure 1:
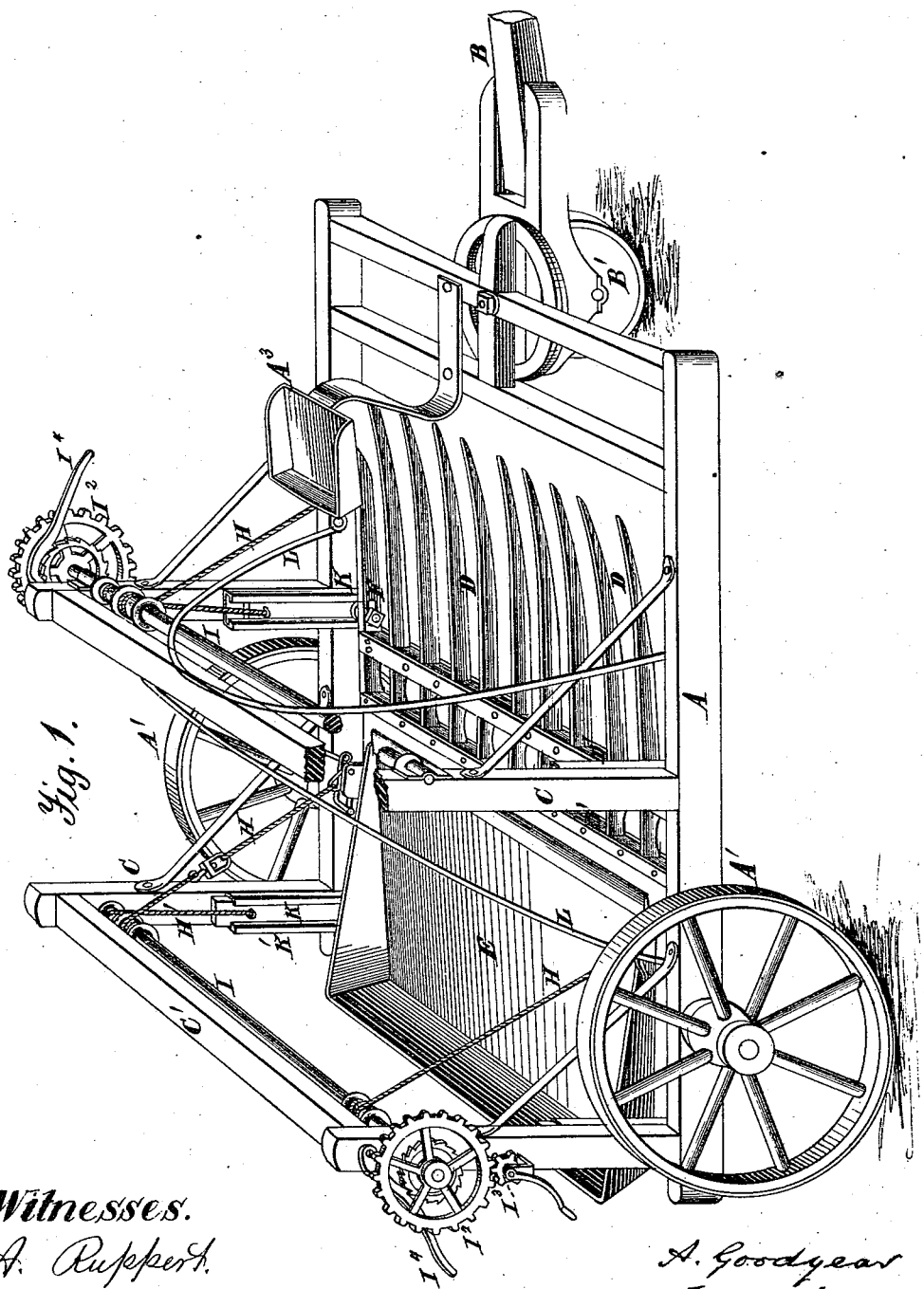
Figure 2:
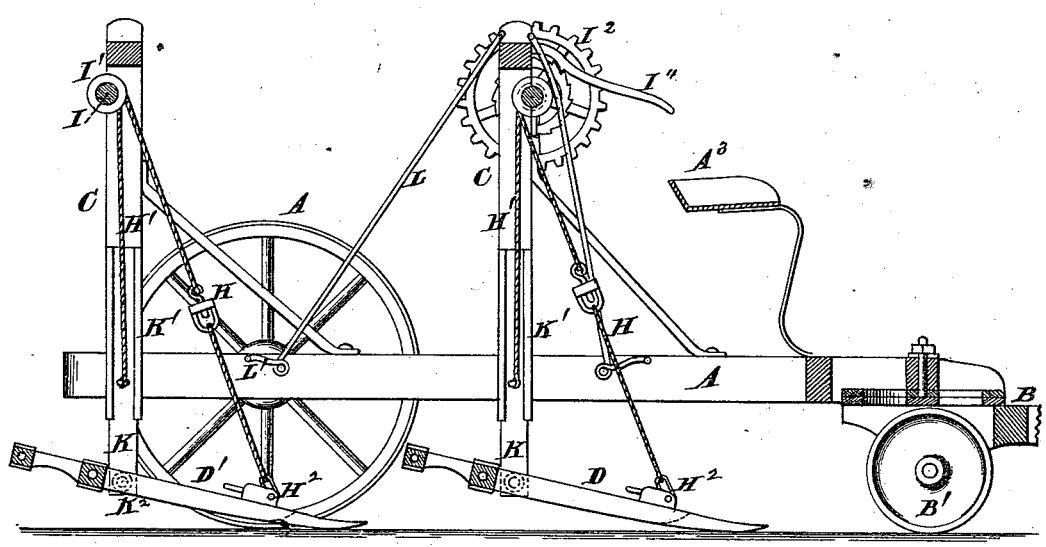
Figure 3:
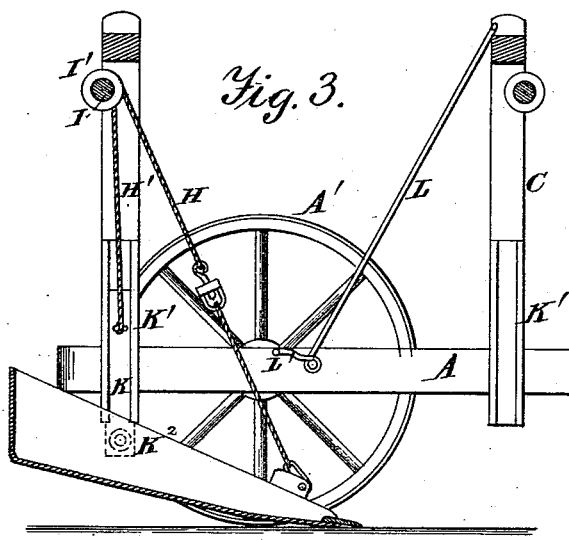
Figure 4:
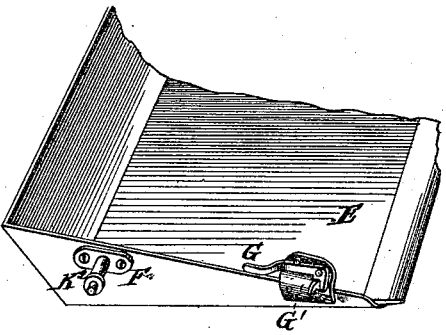
Figure 5:
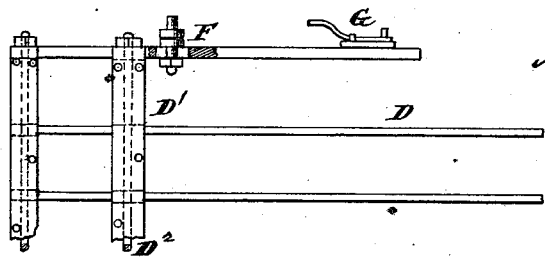

In the annexed drawings, Figure 1 is a perspective view of the machine. Fig. 2 is a vertical longitudinal section, showing the machine as arranged with a second rake instead of a scraper. Fig. 3 is a vertical longitudinal section, showing the mode of suspending and dropping the scraper. Fig. 4 is a perspective view (in part) of the scraper, showing the devices for attaching it. Fig. 5 is a top view of the rake, showing its construction.

The same letters are employed in all the figures in the indication of identical parts.

The machine is attached to a rectangular frame, A, which is properly braced and mounted upon side wheels $A^1$, and furnished with a driver's seat, $A^2$. The tongue is attached to the frame by means of a bolt passing through the hounds, which rest on a single wheel, $B'$, so that the machine may be turned in its own length. Vertical frames are formed by the side pieces C C, bolted to the frame A, and connected at the top by the cross-pieces $C'$.

The vertical frame is braced to support the weight of the forks D and scraper E.

Instead of the scraper, however, another fork, as shown in Fig. 2, may be used. The tines are shaped as shown in Fig. 2, and have two holes, to receive rods $D^2$, passing through all of them. Independent blocks, bored to receive the rods, are placed between the tines to keep them in proper position; and the whole are secured by iron plates $D^1$ extending across the fork, and firmly bolted through and through.

Stud-pins F are fastened on each side of the forks or scrapers, toward the rear, as shown in Figs. 4 and 5; and in front plates are bolted on, to which L-formed latches are pivoted, near the angle. These latches are shown distinctly at G in Fig. 4. On the short arm of the latch is a hook, $G'$, turned down when in position to receive the eyes $H^2$ on the chains H $H^1$, as shown in Fig. 4, but which, when the long arm of the latch is pressed downward, will disengage the eyes. This hook is in such relation to the pivot of the bell-crank lever that when the suspending-chains draw on the eyes the line of draft will cross the long arm of the latch behind the pivot, and so sustain the load upon the fork or scraper so long as the long arm is horizontal; but when the long arm is forced down the hooks will release the eyes, and allow the front ends of the fork and scraper to fall.

Swivels, with a hook having a thread upon the shank, should be used on the chains, on one side, to permit the perfect adjustment of the two chains.

The chains H and $H^1$ are, respectively, attached to the shaft I; but the forward chain H is fastened to a spool on the shaft I, indicated by $I^1$. As this has a greater diameter than the shaft I has when the chain $H^1$ is attached, it follows that, as the shaft I is rotated by means of the spur-wheel $I^2$ and pinion and crank $I^3$, the chain H will be wound or unwound faster than the chain $H^1$, and consequently the points of the rake or front edge of the scraper will move faster than the rear end. These motions should be so graduated that when the forks and scraper are raised they shall be horizontal or a little raised in front, and when dropped they shall stand at an angle, as shown in Figs. 2 and 3. When suspended they are sustained by the pawl and ratchet, shown at I⁴. The stud-pins F engage the sliding blocks K, to which the chains H¹ are attached, and which move up and down in the guides K¹, which are metallic plates covering the sides and bent over the faces of the blocks. The blocks should fit neatly in the guides, and their upper ends should be square. Friction-wheels K² are placed on the stud-pins F to enter the guides; but the length of the latter should be such that when the fork or scraper is down, and in position to take on a load, the friction-wheels should pass below the guides. The object of this is to increase the friction when the load is being taken on, so that the fork or scraper may not be raised; but when the load is raised, by the chains and operative mechanism, then the friction-wheels, entering the guides, will prevent undue resistance.

In order to enable the operator to disengage the eyes H² from the hooks G¹, bails L are pivoted on each side of the frame, and carried up within convenient reach of the driver. The ends of the bails are extended beyond the pivot, so as to bear on the long arms of the latches G when the forks and scraper are raised. By pushing back the bails the long arms of the latches will be forced down, and the hook G′ turned up to disengage the eyes H², and dump the fork and scraper.

The machine is operated in the following manner: If there is a large amount of long manure, I would attach two forks. When the ground is to be cleaned up the scraper may be attached. If both forks are attached they must take up their loads successively. If the fork and scraper are used they may be both in operation at the same time. By turning the winches the fork or scraper may be let down, and the horses so driven that the fork will engage the long manure, and catch up such a quantity as it can carry. The outside tines are made shorter, so that the straw may not wedge against the frame. When loaded they are raised by the operator, and the wagon, with its load, driven to the field, when, by throwing back the bails, the fork and scraper may be dumped so as to drop the load. The length of the guides should be sufficient to permit the fork or scraper to turn over the stud-pins rising in the guides, and the points turning under. The driver then readjusts the fork and scraper, attaching the eyes to the hooks as before, and the machine is ready to take on another load.

What I claim as my invention, and desire to secure by Letters Patent, is—

1. The combination, in a self-loading manure-wagon, of an independently operative fork and scraper, for simultaneously taking up the long and short stuff, substantially as set forth.

2. The independently operative fork or scraper, in combination with the lifting-chains H H¹, whereby the scraper or fork may be lowered and inclined to take on a load, and raised for carrying it away, substantially as set forth.

3. In combination with the fork or scraper and chains H H¹, the eye H² and hooked latch G and disengaging-arm L′, substantially as set forth.

4. In combination with the fork or scraper and chains H H¹, respectively attached thereto in front and rear, the shaft I and sleeve I¹, for communicating a more rapid movement to the points in rising or falling, substantially as set forth.

5. In combination with the fork or scraper, the blocks K and guides K¹ and friction-wheel K², arranged in such relation to each other that when the former are taking on a load the latter shall be below and out of contact with the guides, substantially as set forth.

In testimony whereof I have signed my name to this specification in the presence of two subscribing witnesses.

ANDREW GOODYEAR.

Witnesses:
   D. P. HOLLOWAY,
   B. EDW. J. EILS.